April 24, 1951  J. M. CARLIN ET AL  2,550,223
ADAPTER PULLEY FOR MOTOR VEHICLE GENERATORS
Filed March 28, 1947  2 Sheets-Sheet 1

INVENTORS:
Joseph M. Carlin
Ceilon Hamp Pentz
By Hinkle, Horton, Ahlberg, Hausmann & Hupper
Attorneys April 24, 1951     J. M. CARLIN ET AL     2,550,223
ADAPTER PULLEY FOR MOTOR VEHICLE GENERATORS
Filed March 28, 1947     2 Sheets-Sheet 2
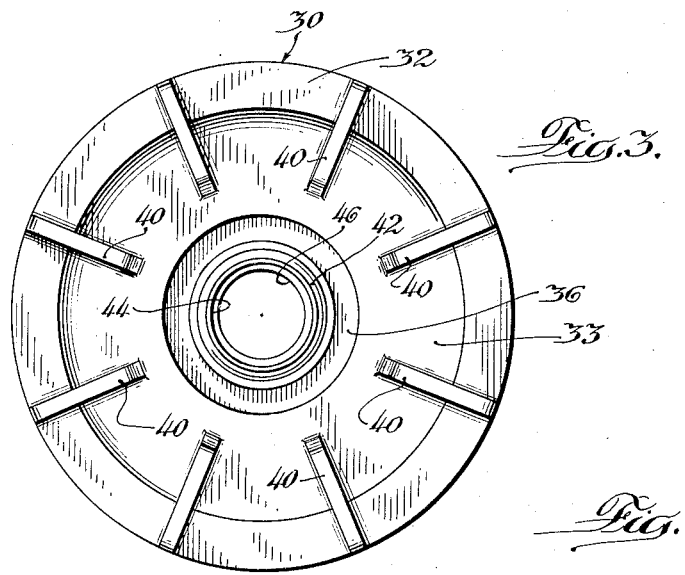
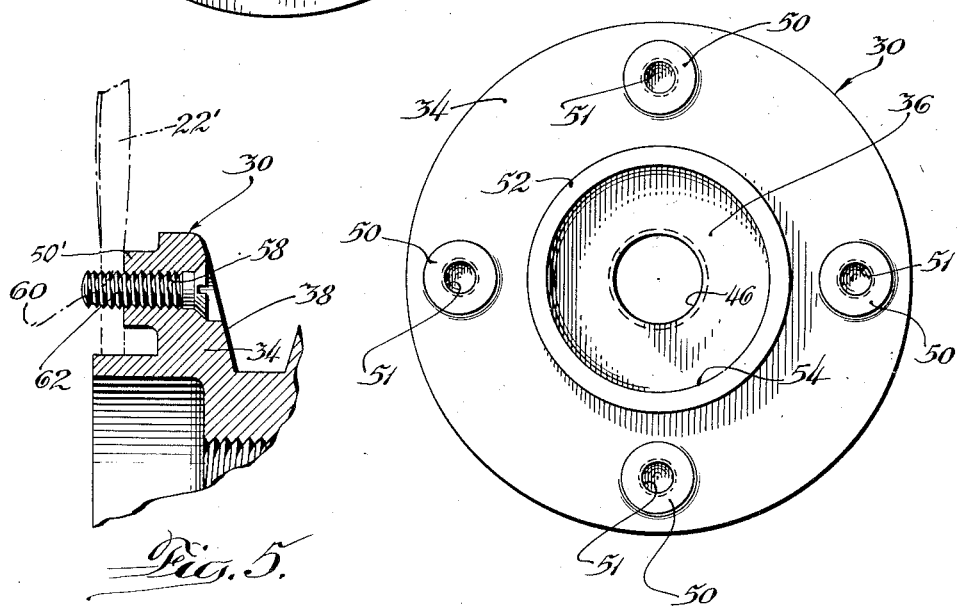
INVENTORS:
Joseph M. Carlin
Ceilon Hamp Pentz
By Hinkle, Horton, Ahlburg, Hausmann & Kipper
Attorneys.

Patented Apr. 24, 1951

2,550,223

UNITED STATES PATENT OFFICE 2,550,223

ADAPTER PULLEY FOR MOTOR VEHICLE GENERATORS

Joseph M. Carlin and Ceilon Hamp Rentz, Jacksonville, Fla.

Application March 28, 1947, Serial No. 737,978

5 Claims. (Cl. 230—241)

Our invention relates to an adapter pulley for motor vehicle generators.

The modern automobile is equipped with several pieces of electrical equipment including high powered headlights, radios and heaters (which usually incorporate an electric motor-driven blower) and frequently electric fuel pumps, electric clocks and windshield wipers. These electrically operated accessories place a very heavy drain upon the storage battery which furnishes the electric power for the automobile.

This drain has been increased during the past six or eight years by the use of a headlight which draws a large amount of current—substantially more current than previously used headlights—and which may be of the type sold on the market under the trade designation of "Sealed Beam" headlights.

These headlights were not standard equipment or even obtainable for automobiles several years ago. However, it is now possible to replace the old type of headlight with a conversion unit so as to equip one of these older automobiles with this modern high powered headlight. Frequently the electric system of the older automobile is not capable of generating the amount of current required to operate these headlights in addition to the other electrical accessories which are installed on the automobile.

One example is the automobile manufactured by the Ford Motor Company prior to 1939. A large number of these automobiles are still in use and the owners are equipping them with the high power headlight conversion unit. In order to make this conversion the generator and cutout, which were formerly standard equipment, must be replaced with a higher output generator and voltage regulator. However, there are certain constructional features of the Ford V-8 automobile which make this change somewhat difficult, among them being the fact that the fan for cooling the radiator of the motor cooling system is mounted upon the generator shaft instead of being separately mounted as is customary.

The principal object of our invention is to provide a novel adapter pulley for a high current output generator which incorporates means for mounting the cooling system fan upon the generator shaft.

Another object is to provide a novel adapter pulley which is simple and rugged in construction and economical to manufacture.

A further object is to provide a novel adapter pulley which makes the generator change on the previously mentioned Ford V-8 automobiles a simple operation without necessitating the rearrangement of any of the other motor accessories.

Other objects and advantages of our invention will become apparent from the following description taken in conjunction with the accompanying drawings, wherein:

Fig. 3 is an elevational view of one face of the pulley and may be considered as being taken along the lines 3—3 of Fig. 2, looking in the direction of the arrows;

Fig. 4 is an elevational view of the opposite face of the pulley and may be considered as being taken along the lines 4—4 of Fig. 2, looking in the direction of the arrows; and Fig. 5 is a fragmentary cross-sectional view similar to Fig. 3 illustrating an alternative construction for mounting the cooling system fan upon the pulley.

Figure 1:
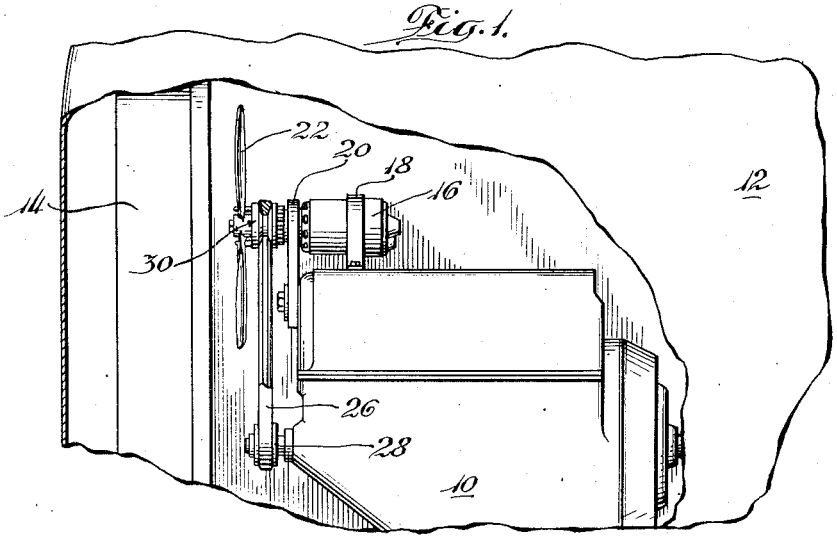
Fig. 1 is an elevational view of a Ford V-8 engine and cooling system radiator illustrating our adapter pulley mounted on the armature shaft of a high current output generator and showing its relation to the cooling system fan.

Referring first to Fig. 1, we have shown in somewhat diagrammatic form a Ford V-8 engine, indicated generally by the reference character 10, which is mounted under the usual hood 12 and to the rear of a cooling system radiator 14. A high current output generator 16 having an armature 15 and a field winding 17 is mounted on top of the motor 10 and between the two cylinder banks by means of a pair of mounting brackets 18 and 20. A fan 22, for directing air across the coils of the radiator 14, is mounted upon generator armature shaft 24 in a manner to be hereinafter described.

The fan 22 and generator 16 are driven by a V-belt 26 which passes over a pulley 28 mounted upon the forward end of the engine crankshaft. The belt 26 drives a pulley 30 which is the adapter pulley of our present invention.

Our pulley 30 preferably is made as a casting and has a pair of flanges 32 and 34 integral with a hub portion 36, the flanges 32 and 34 defining a V-groove 38 in which the V-belt 26 rides.

Figure 2:
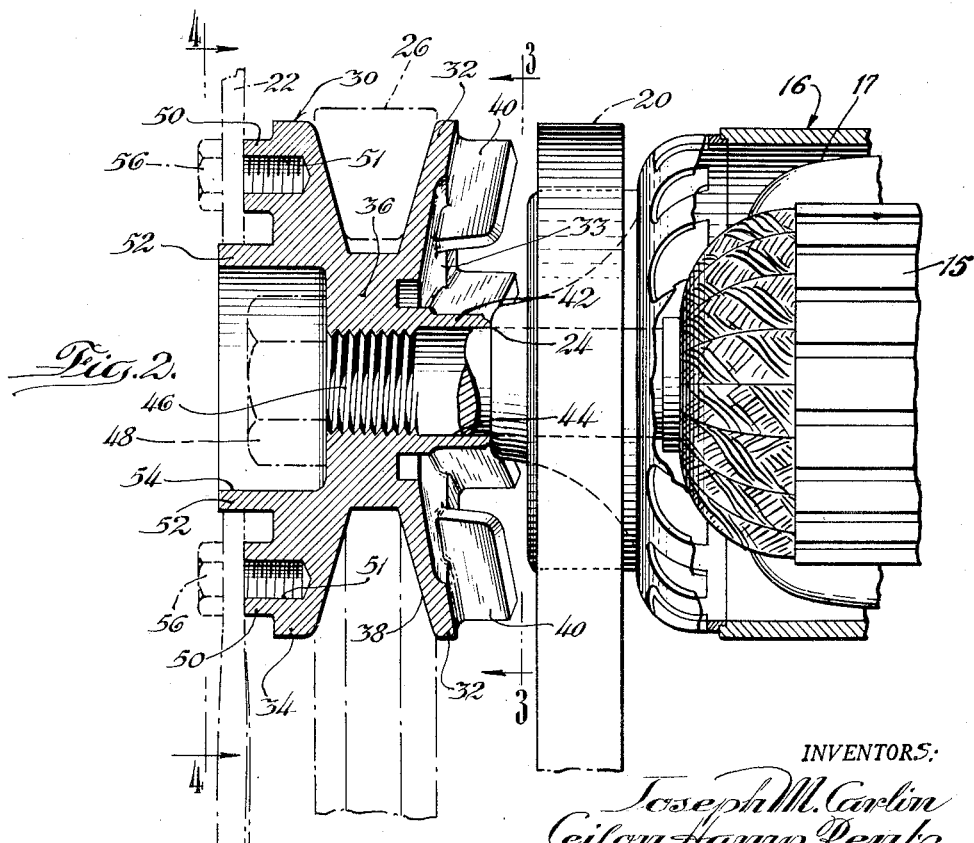
Fig. 2 is a cross-sectional view on a greatly enlarged scale of our adapter pulley showing the method of mounting it upon the generator shaft and showing the fan blade attached to the pulley (the outer end of the generator armature shaft and fan blade being shown in phantom lines)

The flange 32 has a generally concave outer face 33 directed toward the generator 16. As the generator is of the high current output type it generates considerable heat which materially reduces its efficiency and output. As seen in Fig. 2 the pulley 30 has substantially the same outer diameter as the generator 16 in order that the armature 15 be driven at the speed proper to provide sufficient current for the storage battery at the proper voltage. In order to minimize the shielding egect of the pulley 30, we provide the outer face 33 of the flange 32 with a plurality of integral blades 40 which blow a stream of air directly through the generator housing to cool the coils of the field winding 17 and armature 15. It is seen from Figs. 2 and 3 that while the blades 40 have substantial area their dimension axially of the pulley is less than the radial dimension. By this arrangement a substantial blade area can be obtained without unduly extending the axial width of the pulley. The concavity of the face 33 is also a factor in increasing the blade area.

On the face 33 of the pulley there is formed a hub extension 42 which encircles or embraces the generator armature shaft 24. Bore 44 in the hub 36 is provided with suitable threads 46 at the center of the hub by means of which the pulley 30 is threaded onto the outer end of the armature shaft 24. A lock nut 48 insures that the pulley 30 will not work off the generator shaft as the car is in operation, and the hub extension 42 acts as a guide properly to position the pulley on the armature shaft 24 with respect to the generator.

The flange 34 of the pulley 30 faces forwardly of the automobile and is provided with four bosses 50, tapped at 51. The bosses 50 are spaced equidistantly from each other and from the axial center of the pulley 30.

Formed between the bosses 50 and the axis of the pulley 30 is a cylindrical flange 52 which defines a recess 54 within which the lock nut 48 is contained so that it does not project beyond the forward face of the pulley. The outer edge of the flange 52 projects beyond the faces of the bosses 50 and its outer cylindrical surface provides a seat for the inner edge of the central opening of the fan 22. The fan 22 is provided with suitable bores or holes through which cap screws 56 are threaded into the tapped openings 51 to secure the fan 22 to the forwardly directed face of the pulley 30. In this manner the fan 22 is mounted on the pulley 30 which in turn is mounted for rotation with the generator shaft 24, all of which are driven by the V-belt 26 from the engine crankshaft.

It is evident that we have provided a simple and single unit by means of which an automobile may be equipped with a higher current output generator without rearranging any of the other parts of the engine which are customarily driven by the fan belt 26 and by means of which the fan 22 is retained in its customary position upon the generator armature shaft. It will be appreciated that the conversion in the automobile from a low current output generator and cutout to a high current output generator and voltage regulator can be made quickly, readily and economically.

In Fig. 5 we have shown a modified form of pulley 30 in which bosses 50' are bored through from the outer face to the inner face of the flange 34 as at 58. This permits the use of a fan 22' which has tapped openings 60 for the reception of suitable flathead machine screws 62 which are screwed into the fan 22 from the pulley side of the flange 34. This alternative construction is for use with those fans which are provided with tapped openings 60 rather than holes as was described with the installation shown in Fig. 2. In all other respects the pulley shown in Fig. 5 is identical with that shown in Fig. 2 and has the integral blades 40 for directing the cooling air over the generator.

While we have described our invention with respect to a certain identified automobile, it will be appreciated that the same problem of conversion can be solved in the same or similar manner on other automobiles.

Having thus described our invention, what we claim is new and desire to secure by United States Letters Patent is:

1. An adapter pulley for use with a motor vehicle engine, a generator and cooling system fan comprising a casting having a pair of V-groove defining flanges integral with a hub, an axial tapped bore formed in the hub so that the pulley may be threaded onto the generator armature shaft, a plurality of radially arranged fan blades formed on the outer face of one of said flanges and integral therewith, said fan blades being generally perpendicular to said outer face, a plurality of tapped bosses formed on the outer face of the other of said flanges, and an outwardly directed cylindrical flange coaxial with the hub formed on the outer side of said boss bearing flange and arranged to provide a cylindrical seat for the cooling system fan, said cylindrical flange providing a recess within which a lock nut for securing the pulley to the armature shaft may be contained.

2. An adapter pulley for use with a motor vehicle engine, a generator and cooling system fan comprising a casting having a pair of V-groove defining flanges integral with a hub, an axial tapped bore formed in the hub so that the pulley may be threaded onto the generator armature shaft, a plurality of radially arranged fan blades formed on the outer face of one of said flanges and integral therewith and being arranged generally perpendicular to said outer face so as to blow a stream of cooling air through the generator windings, a plurality of bosses formed on the outer face of the other of said flanges and arranged to receive screws for securing the cooling system fan to the pulley, an outwardly directed cylindrical flange coaxial with the hub formed on the outer side of said boss bearing flange and arranged to provide a seat for the cooling system fan, and an extension of said hub formed on the opposite side of the pulley from said bosses and adapted to encompass the armature shaft on that side of the pulley adjacent the generator.

3. An adapter pulley for use with a motor vehicle engine, a generator and cooling system fan comprising a casting having a pair of V-groove defining flanges integral with a hub, an axial tapped bore formed in the hub so that the pulley may be threaded onto the generator armature shaft, a plurality of radially arranged fan blades formed on the outer face of one of said flanges and integral therewith and being arranged generally perpendicular to said outer face so as to blow a stream of cooling air through the generator windings, a plurality of bosses formed on the outer face of the other of said flanges, said bosses being bored for the reception of screws or bolts for securing the cooling system fan to the pulley, an outwardly directed cylindrical flange coaxial with the hub formed on the outer side of said boss bearing flange and arranged to provide a seat for the cooling system fan, said cylindrical flange providing a recess within which a lock nut for securing the pulley to the armature shaft may be contained.

4. An adapter pulley for use with a motor vehicle engine, a generator and cooling system fan comprising a casting having a pair of V-groove defining flanges integral with a hub, an axial tapped bore formed in the hub so that the pulley may be threaded onto the generator armature shaft, a plurality of radially arranged fan blades formed on the outer face of one of said flanges and integral therewith and being arranged generally perpendicular to said outer face so as to blow a stream of cooling air through the generator windings, a plurality of tapped bosses formed on the outer face of the other of said flanges and adapted to receive screws for securing the cooling system fan to the pulley, an outwardly directed cylindrical flange coaxial with the hub formed on the outer side of said boss bearing flange and arranged to provide a centering means and seat for the cooling system fan, said cylindrical flange providing a recess within which a lock nut may be contained, and an extension of said hub formed on the opposite side of the pulley from said bosses and adapted to encompass the armature shaft on that side of the pulley adjacent the generator.

5. An adapter pulley for use with a motor vehicle engine, a generator and cooling system fan comprising a casting forming the body of the pulley and having a pair of V-groove defining flanges, an axial opening in said body having internal threads formed therein so that the pulley may be threaded onto the generator armature shaft, a plurality of radially arranged fan blades formed on the outer face of one of said flanges and integral therewith, said fan blades being generally perpendicular to said outer faces, a plurality of tapped bosses formed on the outer face of the other of said flanges, and an outwardly directed cylindrical flange coaxial with said internally threaded opening formed on the outer face of said boss bearing flange and arranged to provide a cylindrical seat for the cooling system fan, said cylindrical flange providing a recess within which a lock nut for securing the pulley to the armature shaft may be contained.

JOSEPH M. CARLIN.
CEILON HAMP RENTZ.

REFERENCES CITED

The following references are of record in the file of this patent:

UNITED STATES PATENTS

| Number | Name | Date |
| --- | --- | --- |
| 1,960,282 | Walker | May 29, 1934 |
| 2,154,385 | Riesing | Apr. 11, 1939 |
| 2,205,975 | Heyer | June 25, 1940 |

FOREIGN PATENTS

| Number | Country | Date |
| --- | --- | --- |
| 843,211 | France | June 28, 1939 |